Patented Aug. 1, 1939

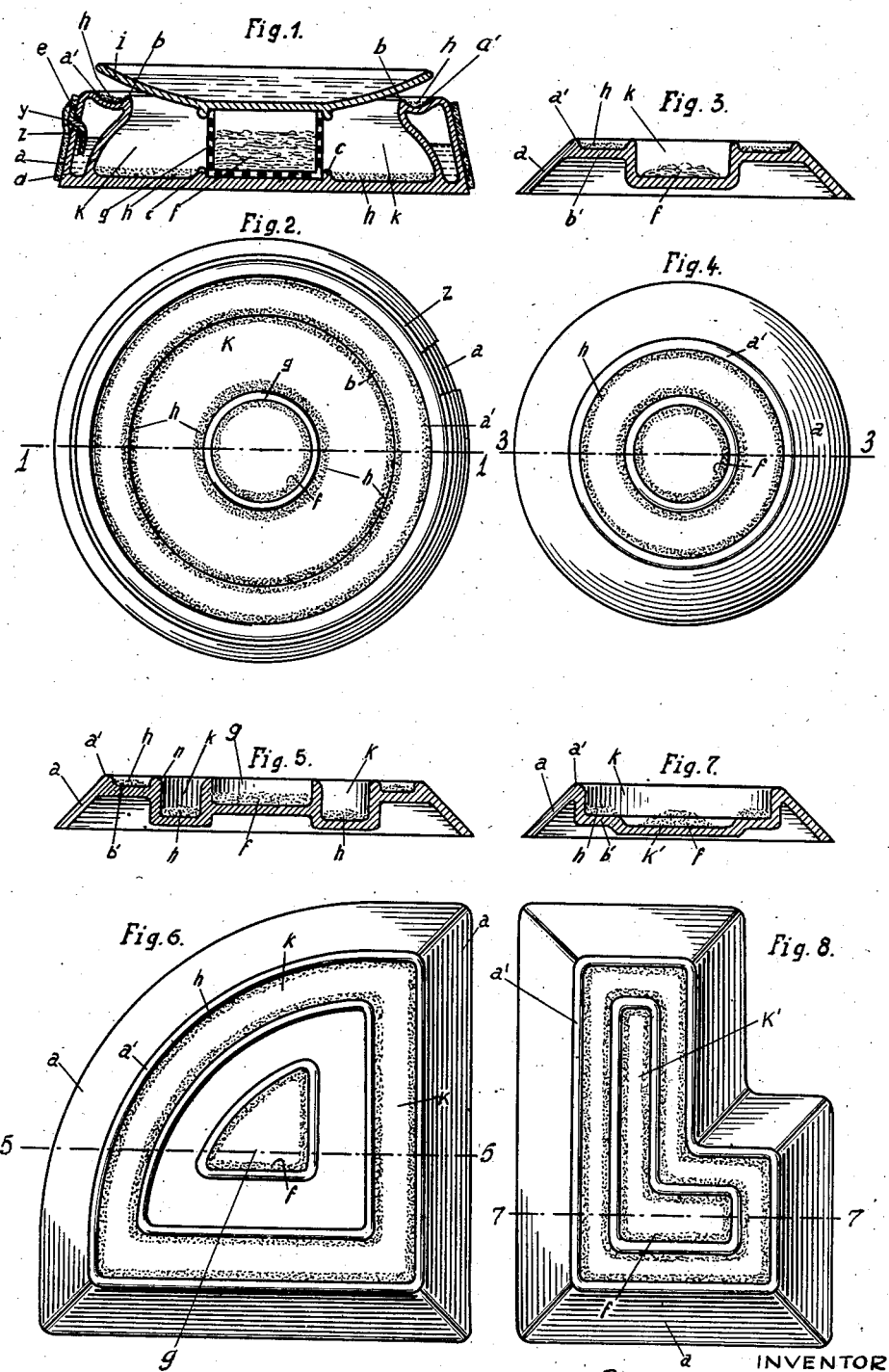

2,167,978

UNITED STATES PATENT OFFICE 2,167,978

INSECT TRAP

Balthasar Jennerich, Cologne, Germany

Application July 30, 1934, Serial No. 737,493
In Germany August 2, 1933

5 Claims. (Cl. 43—121).

My invention relates to traps for house and kitchen vermin, more particularly of insects, such as cockroaches, blackbeetles and other beetles, the legs of which are provided with cupules or cleaving balls.

It is an object of my invention to design a type of trap specially adapted for use in connection with "paralyzing" insect powder i. e., a chemical preparation which, while not necessarily poisonous, is capable of depriving the insects in question of their ability to move on vertical or inclined surfaces.

For the purpose of illustration only, the composition of such paralyzing insect powder, which does not form part of my present invention, will also be described briefly below, but no claims to it or to the methods of its production will be made.

It is usual to destroy cockroaches, blackbeetles and similar insects by means of highly poisonous, such as for instance arsenious preparations, but such methods are highly objectionable because of the danger involved.

Another method consists in the use of so-called insect powders, i. e. preparations obtained by drying and powdering certain herbs. Such preparations, while harmless to other animals, are specifically, though but slightly poisonous to insects. The action of such powders is, however, a slow one and the insects are able to escape to their hiding places where they perish and decay, thus casing a bad smell and turning into a contagious matter.

In both cases mentioned above it is of no significance whether the preparations are simply spread on the floor or placed in special insect traps.

Another method, consisting in filling vessels with a poisonous or sticky liquid is not efficient either because the insects may sip from that liquid without losing their hold on the walls of the vessel, so that they may escape again.

My present invention is intended for use in connection with certain powdery preparations, which may be styled paralyzing powders, which render the cupules and cleaving balls of insect legs ineffective.

Accordingly, house and kitchen vermin climbing smooth steep surfaces not by means of claws, but with the aid of such cupules and cleaving balls can be prevented from moving on and from escaping to their hiding places without resorting to poisonous preparations. The cleaving balls, cupules, etc., on the legs of the insects become covered with a thin layer of the powdery matter, and the insects thus become unable to climb out of a trap, so that they can be found and destroyed.

Traps in accordance with my invention are shown, by way of example, in the accompanying drawing in which:

Fig. 1 is a cross-sectional view of an insect trap provided with a spittoon dish, taken on line 1—1 of Fig. 2, Fig. 2 is a top plan view of the insect trap shown in Fig. 1, the spittoon dish, however, being removed, and a portion of the wick being broken away, Fig. 3 is a cross-sectional view of another embodiment of the insect trap, taken on line 3—3 of Fig. 4, Fig. 4 is a top plan view of the insect trap shown in Fig. 3, Fig. 5 is a cross-sectional view of still another embodiment of the insect trap, taken on line 5—5 of Fig. 6, Fig. 6 is a top plan view of the trap shown in Fig. 5, Fig. 7 is a cross-sectional view of a further embodiment of the insect trap, taken on line 7—7 of Fig. 8, and Fig. 8 is a top plan view of the insect trap shown in Fig. 7.

The trap shown in Figs. 1 and 2 consists of a basin made for instance of earthenware with slanting and, if desired, roughened outer walls $a$, from which a smoothly inclined surface $a'$ and a rounded glazed portion $b$ leads into a catching space $k$. The inclined surface $a'$ and the upper part of the rounded portion $b$ which together, form a nearly horizontal trough and the catching space $k$ are strewn over with my paralyzing powder $h$. Insects reaching the portion $a'$ get their legs into the powder and, even if they should want to turn back and flee, cannot help gliding down into the catching space $k$, which they are unable to leave. In the middle of the trap, bordered by the projecting rim $c$, there is arranged a perforated receptacle $g$, containing the bait, which supports a plate $i$ filled with water and serving as a spittoon. The space between the plate $i$ and the inclined portion $a'$ should be about 1 centimeter in height so that insects climbing up the rim of the trap may touch the plate $i$ with their tentacles and thus feel safe in moving on.

In order to render the trap still more attractive to insects, which are usually very thirsty, there is a hollow space $d$ provided between the portions $a$ and $b$ and filled with water through the openings $e$. Wicks $y$ are inserted in these openings $e$ and these wicks $y$ as well as the slanting outer surface of the wall $a$ are covered with some rough porous material $z$ such as for instance felt or cloth. This cover $z$, as it is kept moist, intensely attracts the insects.

If a spittoon plate $i$ is not wanted, it may be replaced by some suitable cap, for instance a wire gauze cap.

A much simpler trap is shown in Figs. 3 and 4. It consists of an outer slanting portion $a$ leading over a smoothly inclined surface $a'$ to a depressed portion $b'$, which is practically horizontal, strewn over with my paralyzing powder $h$ and separated by a rim from the central catching space $k$ containing the bait $f$.

A still simpler modification particularly suitable for catching small insects such as, for instance, ants is that shown in Figs. 7 and 8 where the area or trough-like depression $b$ strewn over with my paralyzing powder $h$ and the area $k'$ receiving the bait $f$ are both parts of the catching space $k$. Instead of the bait a scented liquid preparation may be used for catching crickets or other insects which can jump.

The trap shown in Figs. 5 and 6 comprises an inclined wall $a$, a smoothly inclined surface $a'$ connecting the top of said inclined wall with a slightly depressed area $b'$ which is practically horizontal and capable of receiving and retaining a paralyzing powder $h$, a deeply depressed catching space $k$ which may also contain paralyzing powder $h$ and a central space $g$ which receives the bait $f$.

In Figs. 2 to 4 I have shown plan views of traps with circular outlines, while plan views suitable to fit corners or edges are shown in Figs. 6 and 8.

I wish it to be understood, however, that my invention is not limited to any particular outlines which may also be elliptic, square, oblong, or the like.

The paralyzing powder, to be used in connection with the traps according to my invention, consists, broadly speaking, of an extremely fine flour of such substances as Portland cement, chalk, gypsum, lime, talcum, dextrin and the like which are either hydroscopic or, at least, easy to be wetted, i. e. hydrophil. Excellent results are obtained with a flour of such a composition passing through a sieve with 4000 meshes per square centimeter. Mixtures of two or more such substances are usually more efficient than the single components.

A still more efficient paralyzing powder may be obtained by first grinding the substances in question, moistening them with water or with a watery, sticky solution, drying the dough thus obtained and grinding it again to the extent mentioned above. Under the microscope, the particles of such a powder display a spongy structure.

In making the dough the water may be replaced at least partly by a watery solution of water glass (alcali silicate).

In addition to the above ingredients, the paralyzing powder may contain flavouring and sweetening substances in order to render it more attractive for insects.

I claim:

1. An insect trap for the use of paralyzing insect powder, comprising an upwardly inclined side wall adapted to permit the insects to pass over same, an open trough-like section for the reception and retention of a paralyzing powder, a smoothly inclined surface connecting the top of said upwardly inclined side wall with said section, and a catching chamber having steep walls and being surrounded by said section.

2. An insect trap for use of paralyzing insect powder, comprising an upwardly inclined side wall adapted to permit the insects to pass over same, an open trough-like section for the reception and retention of a paralyzing powder, a smoothly inclined surface connecting the top of said upwardly inclined side wall with said section, and a central catching chamber having steep walls, said catching chamber being surrounded by said section and designed to recive a bait.

3. An insect trap for the use of paralyzing insect powder, comprising an upwardly inclined side wall adapted to permit the insects to pass over same, an at least approximately horizontal paralyzing section adapted to receive and to retain a paralyzing powder, a smoothly inclined surface connecting the top of said upwardly inclined side wall with the said paralyzing section and a central catching chamber designed to receive a bait.

4. An insect trap for use in connection with paralyzing insert powder comprising an upwardly inclined side wall of a type permitting the insects to pass over it, means to keep said upwardly inclined side wall moist, a catching chamber surrounded by steep walls, an inwardly curved portion leading from the top of said upwardly inclined side wall into said catching chamber and including an at least approximately horizontal paralyzing section adapted to receive and retain a paralyzing insect powder, and a bait receptacle in the middle of the trap.

5. An insect trap for use in connection with paralyzing insect powder comprising an upwardly inclined side wall of a type permitting the insects to pass over it, means to keep said upwardly inclined side wall moist, a catching chamber surrounded by steep walls, an inwardly curved portion leading from the top of said upwardly inclined side wall into said catching chamber and including an at least approximately horizontal paralyzing section adapted to receive and retain a paralyzing insect powder, a bait receptacle in the middle of the trap, a spittoon dish arranged on top of said bait receptacle, the free space between said inwardly curved portion and said dish having a height of about 1 centimeter.

BALTHASAR JENNERICH.